(12) United States Patent
Kobres et al.

(10) Patent No.: US 9,754,093 B2
(45) Date of Patent: Sep. 5, 2017

(54) METHODS AND A SYSTEM FOR AUTOMATED AUTHENTICATION CONFIDENCE

(71) Applicants: Erick Kobres, Lawrenceville, GA (US); Stavros Antonakakis, Lake Mary, FL (US)

(72) Inventors: Erick Kobres, Lawrenceville, GA (US); Stavros Antonakakis, Lake Mary, FL (US)

(73) Assignee: NCR CORPORATION, Duluth, GA (US)

( * ) Notice: Subject to any disclaimer, the term of this patent is extended or adjusted under 35 U.S.C. 154(b) by 137 days.

(21) Appl. No.: 14/610,415

(22) Filed: Jan. 30, 2015

(65) Prior Publication Data

US 2016/0063227 A1    Mar. 3, 2016

Related U.S. Application Data

(60) Provisional application No. 62/043,025, filed on Aug. 28, 2014.

(51) Int. Cl.

| | | |
|---|---|---|
| G06F 21/32 | (2013.01) | |
| G06F 21/31 | (2013.01) | |
| G06F 21/30 | (2013.01) | |
| G06K 9/00 | (2006.01) | |
| G06K 9/46 | (2006.01) | |
| G06K 9/52 | (2006.01) | |
| H04L 9/32 | (2006.01) | |
| H04L 9/08 | (2006.01) | |
| G06Q 20/20 | (2012.01) | |
| H04L 29/06 | (2006.01) | |
| G06Q 20/40 | (2012.01) | |
| G10L 17/00 | (2013.01) | |
| H04W 12/06 | (2009.01) | |
| H04L 29/08 | (2006.01) | |

(52) U.S. Cl.
CPC ....... *G06F 21/316* (2013.01); *G06K 9/00288* (2013.01); *G06Q 20/20* (2013.01); *G06Q 20/206* (2013.01); *G06Q 20/208* (2013.01); *G06Q 20/40* (2013.01); *G06Q 20/401* (2013.01); *G06Q 20/4016* (2013.01); *G06Q 20/40145* (2013.01); *G10L 17/005* (2013.01); *H04L 63/08* (2013.01); *H04L 63/0853* (2013.01); *H04L 63/102* (2013.01); *H04W 12/06* (2013.01); *G06F 2221/2111* (2013.01); *H04L 67/12* (2013.01)

(58) Field of Classification Search
CPC . G06F 21/30–21/32; G06K 9/00; G06K 9/32; G06K 9/46; G06K 9/52; H04L 63/08
USPC ................................ 726/2–4, 16, 21, 26–28
See application file for complete search history.

(56) References Cited

U.S. PATENT DOCUMENTS

| | | | | |
|---|---|---|---|---|
| 2014/0093140 | A1* | 4/2014 | Juveneton | G06K 9/00906 382/117 |
| 2014/0337945 | A1* | 11/2014 | Jia | H04L 63/0876 726/6 |

* cited by examiner

*Primary Examiner* — Joseph P Hirl
*Assistant Examiner* — Kalish Bell
(74) *Attorney, Agent, or Firm* — Schwegman Lundberg & Woessner, PA

(57) ABSTRACT

Input streams are automatically and continuously evaluated in a passive manner from sensors and resources of a device. The streams are weighted and aggregated to produce single confidence values. A current single confidence value is used to passively authenticate a user for access to the device or to one or more resources of the device when the user attempts access.

11 Claims, 12 Drawing Sheets

/ 130

| Input | Type | Characteristics |
|---|---|---|
| Location | Continuous | Position vector [x,y,z] |
| Audio | Continuous (sample) | Audio data blob in a standard format (ie wav, mp3, wma...) |
| Portrait snapshot | Discrete, unsolicited (non-periodic) | Graphic image blob in standard format (i.e. jpg, png, gif,...) |
| Device unlocked using manual authentication (password entry, biometric, etc) | Discrete, unsolicited (non-periodic) | A high contributor to overall confidence level that decays quickly over time. |
| Accelerometer | Continuous | Vector of acceleration data around device axis': [RMS, x-axis acc, y-axis acc, z-axis acc] |
| Gyroscope | Continuous | Vector of rotational velocity around around device axis': [X rads/sec, Y rads/sec, Z rads/sec] |
| Confidence % inputs from other connected devices or wearables. | Various (see characteristics.) | Two securely connected devices can share their individual confidence % values. For if the owner of a mobile phone is currently wearing and authenticated on his connected smart watch and the smart watch is paired with the phone, then the smart watch confidence % can be used as a direct confidence value component by the mobile phone. |
| Application lifecycle events | Discrete, unsolicited (non-periodic) | App lifecycle events occurring in the OS (start, suspend, shutdown, ...) are fed into the system as they occur. |
| Device OS user events | Discrete, unsolicited (non-periodic) | OS user events such as button clicks, gestures and on-screen control manipulations (keystrokes, scrolls, switch toggles, checks, ...) are fed into the system as they occur. |

FIG.1D

| Execution Location | Execution Environment | Characteristics |
|---|---|---|
| Locally, On Device | OS user space | Processes accessible by common OS user rights |
| | OS kernel space | Privileged access (requires root access) |
| | TEE | Confidential, authenticated |
| | SE | Confidential, authenticated, tamper resistant |
| Nearby, other connected wearable device | OS user space | Processes accessible by common OS user rights |
| | OS kernel space | Privileged access (requires root access) |
| | Device firmware | Proprietary and difficult to access without physically interfacing to chip. |
| | TEE | Confidential, authenticated |
| | SE | Confidential, authenticated, tamper resistant |
| Remote service (cloud or other) | OS user space | Infrastructure physically secured in data center and electronically secured with firewalls, network IDS and managed IT access rights. |
| | HSM | Data center physical and electronic security including additional hardware security for protection of sensitive data |
| | HSM/TEE | HSM characteristics with mechanism for trusted software execution (assuming HSM can execute code securely as well as store secrets) |

FIG. 1G

| Interconnect Method | Additional details |
| --- | --- |
| Secure Microcontroller on-chip comm | |
| Non-secure microcontroller On-chip comm | |
| Hard-wired chip-to-chip comm | |
| Bus card (PCI, SATA, etc) | |
| Serial comm (USB, FireWire, RS-232, TB, etc.) | |
| PC Secure Element memory-to-memory comm | |
| PC CPU memory-to-memory comm | |
| Network – Wired Ethernet – 802.3xx | |
| Network – Wireless Ethernet – 802.11xx | WPA2, WPA, WEP, No wireless security |
| Network – General – TCP Protocol | TLS 1.x, SSL 3.x, other secure session protocols, no TCP security |
| Bluetooth | Light pairing & authentication support. |

FIG. 1H

METHODS AND A SYSTEM FOR AUTOMATED AUTHENTICATION CONFIDENCE

RELATED APPLICATIONS

The present application claims priority to, and is a non-provisional filing of Provisional Patent Application Ser. No. 62/043,025 entitled: "Passive Authentication and Authentication Confidence Calculator," filed on Aug. 28, 2014, the disclosure of which is incorporated in its entirety herein and below.

BACKGROUND

Electronic authentication is commonplace in today's highly-connected society, especially in view of the fact that more and more individuals are conducting financial and personal transaction electronically.

Authentication can come in a variety of forms, such as single-factor authentication and multifactor authentication. Authentication can be done with different degrees of perceived strength. For example, biometric authentication is typically believed to be a stronger form of authentication than an identifier and password combination.

Some authentication requires a user to possess something (such as a token or a magnetic card) and to know something (such as a password or key value). Generally, authentication requires some action on the part of the individual being authenticated, such as having finger scanned, entering a card and Personal Identification Number (PIN), providing a token or certificate with a key, and the like.

Most authentication techniques are binary in nature, which means the authentication technique authenticates an entity or fails to authenticate the entity. Authentication is typically associated with individuals being authenticated but in fact, hardware resources and software resources are also subject to authentication in computer systems.

However, if authentication is wanted not for necessarily performing a secure transaction, accessing a secure system, or verifying a secure asset but, rather authentication is wanted for deciding whether there is a measurable degree of confidence that someone can be identified without any affirmative knowledge or action on the part of that someone, then very little exists in the industry for this type of authentication. But, such a technique can provide a variety of beneficial opportunities for enterprises for purposes of: marketing, customer service, Customer Relationship Management (CRM), security within an enterprise, security of an individual's personal device, security within law and government agencies, and the like.

Therefore, there is a need for improved authentication mechanisms.

SUMMARY

In various embodiments, methods and a system for automated authentication confidence are presented.

According to an embodiment, a method for automated authentication confidence is presented. Specifically, data from at least one input stream are obtained and components from the data are aggregated into a single value. Next, passive authentication is initiated by using the single value to authenticate a user for access to one of: the device and a resource of the device.

BRIEF DESCRIPTION OF THE DRAWINGS

FIG. 1D is a table illustrating the some input sources for a confidence calculator, according to an example embodiment.

FIG. 1G is a table illustrating execution environments and characteristics of the locations where a confidence calculation can be processed, according to an example embodiment.

FIG. 1H is a table illustrating a security-based priority-ordered listing of connection types as factors for consideration by confidence calculators, according to an example embodiment.

DETAILED DESCRIPTION

Figure 1A:
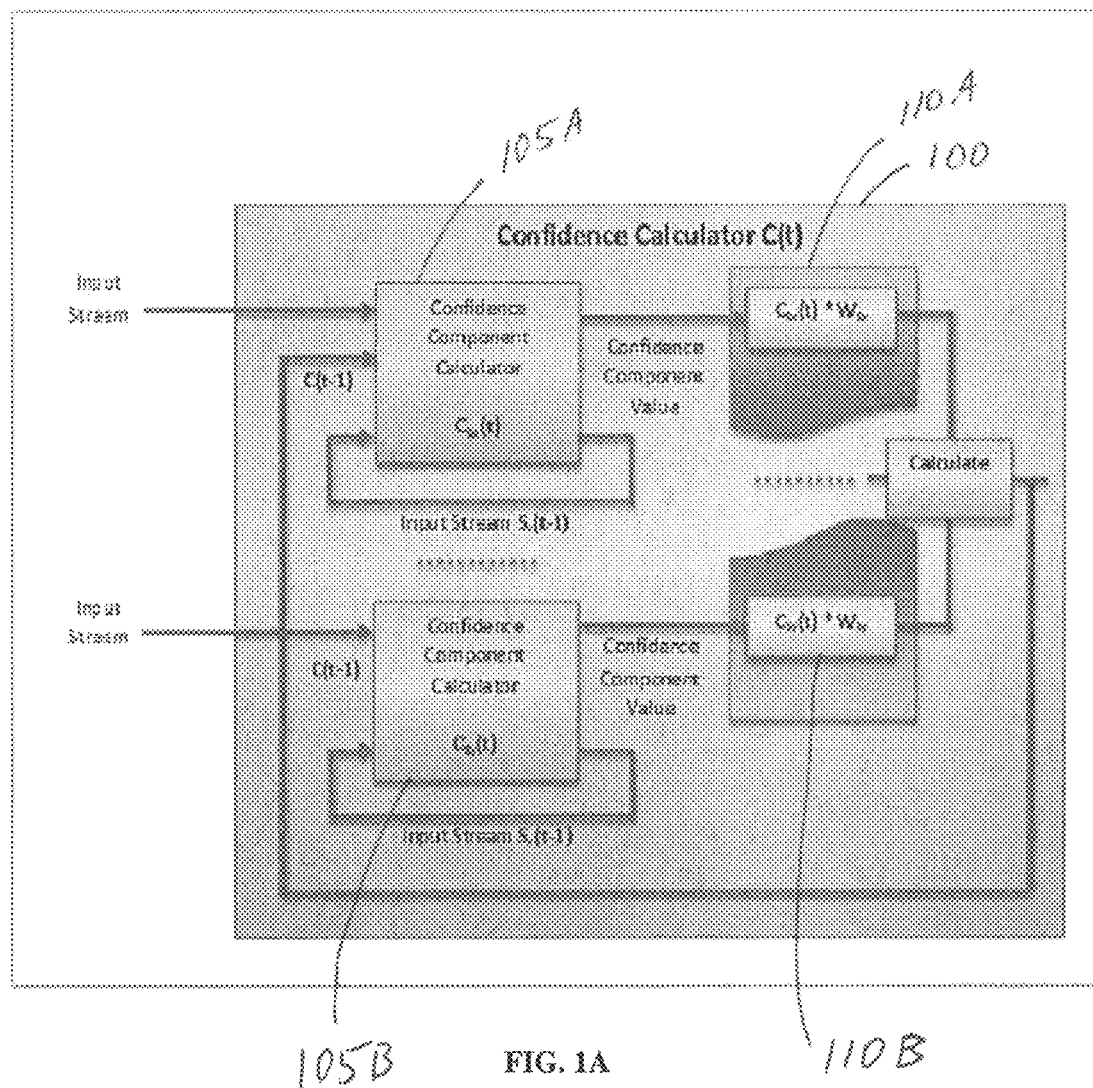
FIG. 1A is a diagram of components for processing an instance of a confidence calculator, according to an example embodiment.

FIG. 1A is a diagram of components for processing an instance of a confidence calculator, according to an example embodiment. It is to be noted that the components are shown schematically in greatly simplified form, with only those components relevant to understanding of the embodiments being illustrated.

As used herein term "confidence" and the phrase "confidence value" may be used interchangeably and synonymously. The term and phrase refer to a computed scalar value provided through the various mechanisms and inputs to those mechanisms discussed herein and below. The scalar value is relevant to determining whether a user and/or a device associated with that user is to be authenticated. That is, the scalar value when compared to a predetermined value may provide authentication of a user and/or of a device.

The authentication performed is "passive," which means that the user does not have to affirmatively provide (through a manual input mechanism) any credential to achieve authentication; rather, the confidence associated with ongoing and continuous authentication of the user and/or device occurs through regularly computing, in an unobtrusive and transparent manner from the perspective of the user, the authentication confidence (scalar value), which is then compared with a predetermined value to determine whether authentication was achievable or not achievable.

It is noted that based on the comparison between any computed confidence and any predetermined value; authentication does not have to be a binary exercise. That is, a user may be granted different levels of access (to resources of a device) based on a computed difference between the confidence value (at any given point in time) and a predetermined value. For example, when the different between the computed confidence and a predetermined value is within a predefined range, then the user is granted access to limited resources and not all available resources on a device. This is but one example; the point is that confidence with respect to user/device authentication can result in: a failed authentication having no access to any resources, a successful authentication having access to all resources, or a limited authentication having varying levels of access to some resources.

A "confidence calculator" is one or more software modules implemented as executable instructions within a memory of a device and/or on a non-transitory computer-readable storage medium of the device. The executable instructions execute on one or more processors of the device.

The confidence calculator can be executed in multiple different processing environments and on multiple different devices as a particular "instance" of the confidence calculator. Multiple instances of the confidence calculator may cooperate with one another to produce a single confidence value. In some cases, multiple instances of the confidence calculator may be chained together, such that output from one instance becomes one input value to a next instance in the chain of confidence calculators.

FIG. 1A illustrates components of an instance of a confidence calculator 100. The confidence calculator 100 includes two separate sub confidence component calculators 105 A and B (first stage functions), each first stage function configured to handle a particular type of input stream data. Each input stream data associated with a different source that provides that input stream. It is noted that although only two input streams are shown, the techniques shown herein are not so limited. That is, the confidence calculator 100 can be input source/stream agnostic allowing for a heterogeneous assortment of input streams (discrete, continuous, time-varying, scalars, vectors, etc.). Each desired input stream type can be added as a configured first stage function to a confidence calculator 100 to normalize a particular input stream type. Each individual first stage function is also configured to decide how to transform (aggregate, weight, and compute) its input stream into a single component stream aggregated value. The component input stream-specific values are provided to a second stage function 110 A and B to calculate a single outputted value for a given instance of a confidence calculator 100 (as an authentication confidence value).

Figure 1B:
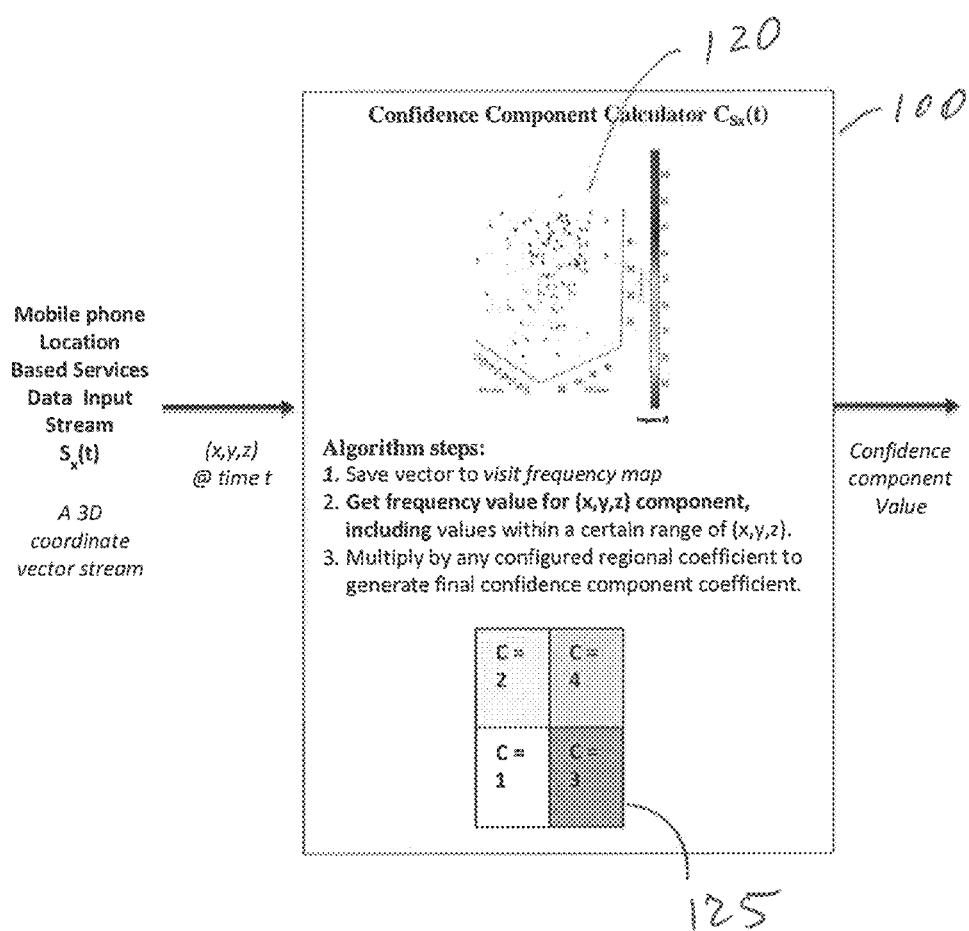
FIG. 1B is a diagram of a graph illustrating a vector type single-input confidence component calculator, according to an example embodiment.

FIG. 1B is a diagram of a graph illustrating a vector type single-input confidence component calculator 100, according to an example embodiment.

The single-input stream is represented as a vector of information representing geographical positioning information (three-dimensional (longitude (x), latitude (y), and altitude (z)) at a given time (t). An instance of the confidence calculator 100 samples the current location from a mobile device or wearable device equipped with a Global Positioning Satellite (GPS) system. In the example case, the confidence calculator 100 just uses this single input stream, which is a time-based series of three-dimensional vectors providing a user's device current location on earth.

The values from the vectors being captured, at predefined intervals of time, are stored by the first stage function of the confidence calculator 100 in a frequency map 120 and a confidence component value is generated, by the first stage function, by multiplying the calculated frequency (which includes the total frequency for values within a certain range of the point) by a coefficient 125 applicable to the region the current location is in. This coefficient map (two-dimensional (2D) for ease of illustration) provides a higher confidence coefficient for the user's home location and work location. Thus, the coefficient is a weight provided on the input stream (geographical location) based on a frequency with which the user was at particular geographical locations for extended periods of time (such as home and work).

Figure 1C:
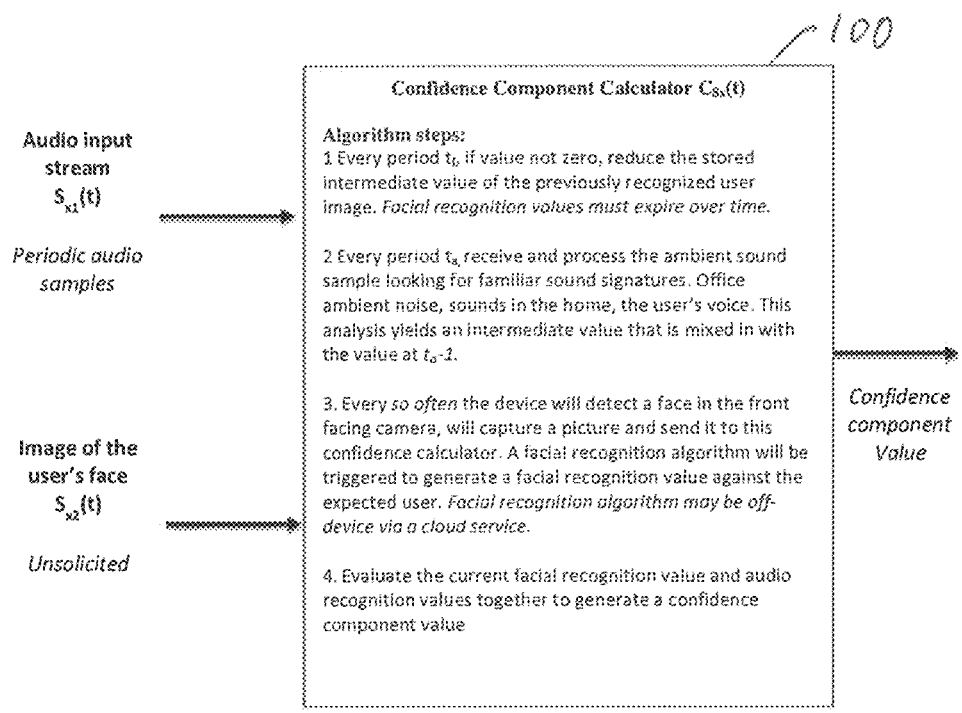
FIG. 1C is a table illustrating two input types for a confidence calculator having with one planned periodic input and one discrete unsolicited input, according to an example embodiment.

FIG. 1C is a table illustrating two input types for a confidence calculator 100 having with one planned periodic input and one discrete unsolicited input, according to an example embodiment.

In this example, the confidence calculator 100 receives two inputs, the first is a snapshot of the user's face from the device's front facing camera, and the second is the audio stream originating from the device's microphone.

The table FIG. 1C describes the processing of the confidence calculator 100 to periodically sample facial images and audio in the environment of the device and create signatures for each. So, when a user attempts to access the device, current samples can be compared against the existing samples to produce a component value for a confidence value.

FIG. 1D is a table 130 illustrating some example input sources for a confidence calculator 100, according to an example embodiment. The table is a non-exhaustive listing of input sources and their associated input stream types for a confidence calculator 100.

Figure 1E:
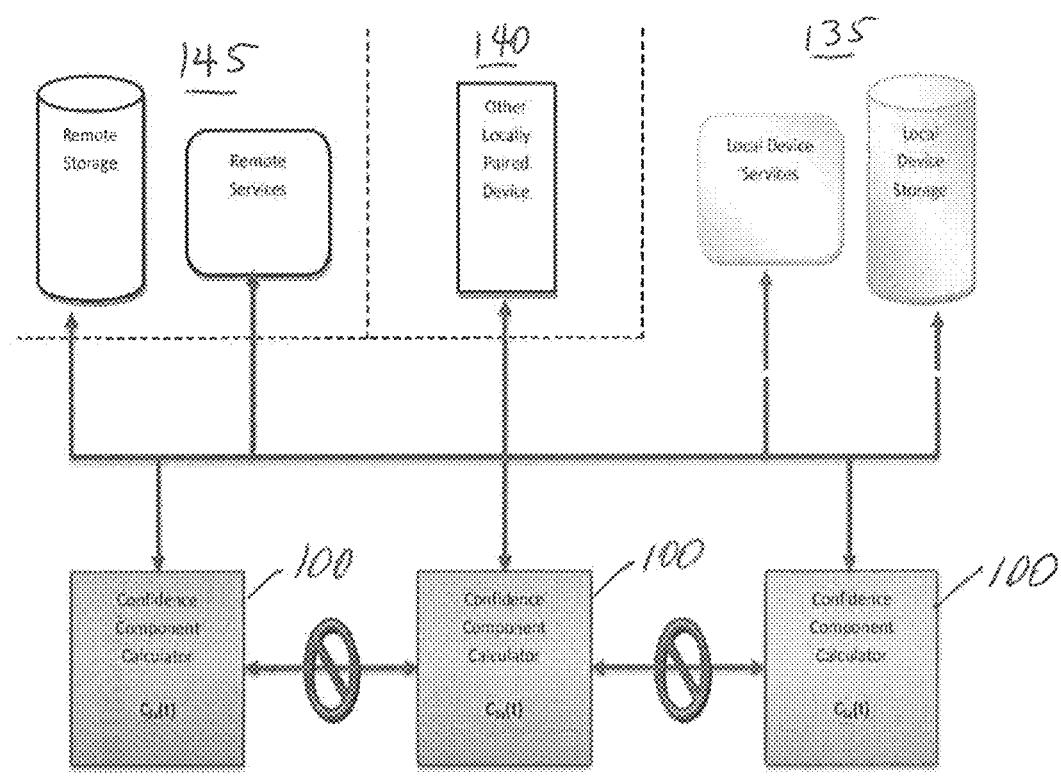
FIG. 1E is a diagram depicting example location for executing confidence calculators, according to an example embodiment.

FIG. 1E is a diagram depicting example location for executing confidence calculators 100, according to an example embodiment.

The first stage functions of confidence calculators 100 can vary in complexity and the services that they leverage. The first stage functions can process input directly in a device for which passive authentication is being performed or they can outsource operations to external and remote services accessible over a network connection. Moreover, the first stage functions can store data in local or remote repositories and make use of historical data available on-device and/or off-device. The first stage functions may even obtain environmental or system data to use in computing a component value from on-device platform services. The only restriction is that no first stage function can directly impact the internal calculations of another first stage function.

The second stage function aggregates all confidence component values from the first stage functions of a confidence calculator 100 into a mixing function effectively merging what amounts to a vector of confidence component values over time into a scalar value over time (confidence value for authentication or authentication confidence value).

The confidence value formula can be represented by the polynomial:

$$C(t)=C_{SX}(t)*W_{SX}+C_{SY}(t)*W_{SY}+\ldots+C_{SZ}(t)*W_{SZ}=\text{Scalar Confidence Value(Authentication Confidence Value)}.$$

Where:

$S_X(t)$ is the input stream component at time t and may be an aggregate of multiple input streams, $C_{SX}(t)$ is the calculated confidence component value for input stream $S_X$, at time t, and $W_{SX}$ is a coefficient that represents the weight to be applied in the overall confidence value calculation.

The $W_S$ weight may itself be a constant, a function of time t, i.e. $C_{SX}(t)*W_{SX}(t)$. The weight and processing associated with determining the weight can be configured based on the needs of the authentication Moreover, the weight factor is independent of other component confidence values (generated by other first stage functions of the component calculator). More specifically, the weight factor cannot be a function of another first stage function $C_S(t)$, when this is the case, the actual first stage function should be reviewed to see if it should have its input stream directed to $C_S(t)$ and removed.

Referring back to the FIG. 1E, differences between instances of confidence calculators 100 may reside in their first stage functions that produce the confidence component values and the location where the confidence calculators 100 execute. FIG. 1E illustrates that confidence calculators 100 can execute: 1) locally on a current device 135, 2) nearby on a paired or interfaced device 140 to the current device, and/or 3) remotely on a server service 145.

The device on which an instance of the confidence calculator 100 executes can also include characteristics relevant to security or authentication confidence. That is, each processing environment or processing context for the device where the confidence calculator 100 executes has a certain level of protection that it naturally provides against physical and electronic attacks. So, by way of example only, some execution contexts on a device that executes a confidence calculator 100 include:

1) Operating System (OS) user space;
2) OS kernel space or driver;
3) Device firmware/embedded systems;
4) Hardware Security Module (HSM);
5) Trusted Execution Environment (TEE); and
6) Secure Element (SE) or Tamper Resistant Security Module (TRSM).

Figure 1F:
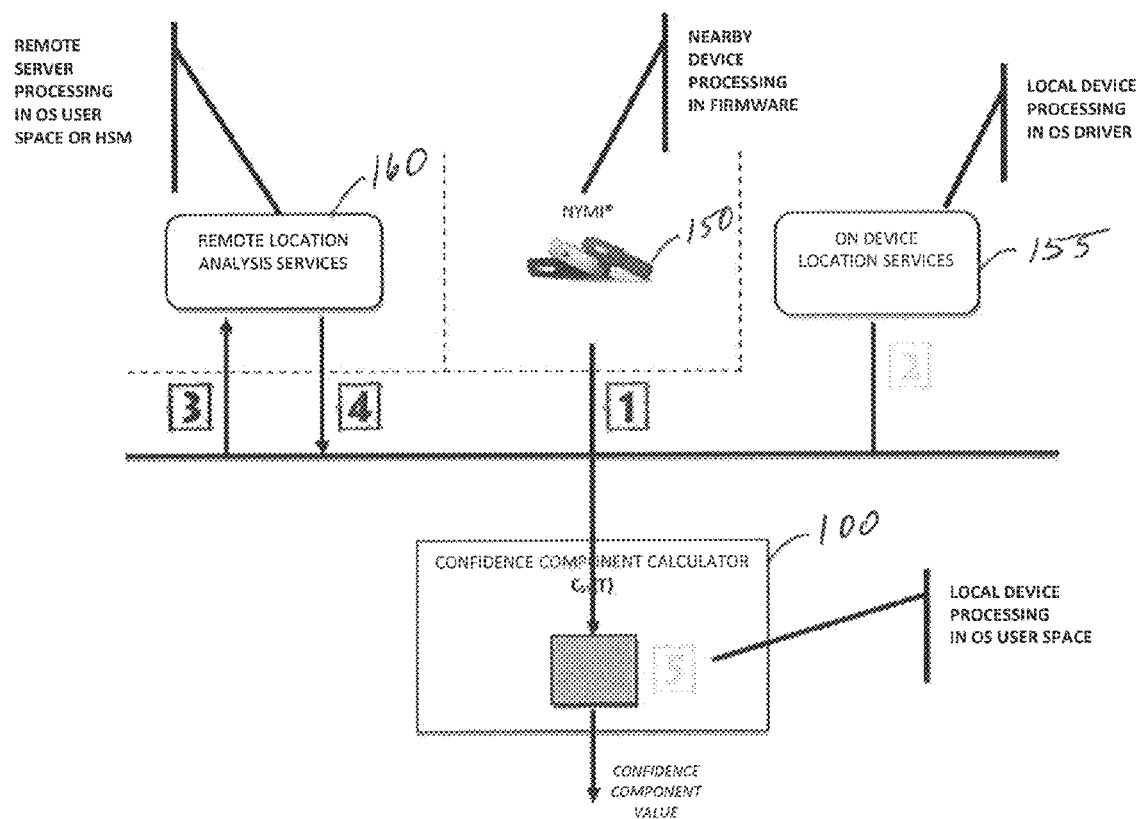
FIG. 1F is diagram depicting an example for gathering multiple inputs from a variety of devices to process an instance of a confidence calculator, according to an example embodiment.

FIG. 1F is diagram depicting an example for gathering multiple inputs from a variety of devices to process an instance of a confidence calculator 100, according to an example embodiment.

In the example provided in the FIG. 1F, the execution location and execution environment (processing environment or processing context) are not mutually exclusive and it is possible for a confidence calculation workflow to be executed over multiple locations (on multiple devices) and multiple execution environments (each device and environment can be different from each of the other devices and other environments in the workflow).

To illustrate this point, FIG. 1F shows a mobile phone that includes an instance of a confidence calculator 100 that uses location history from the mobile phone itself (GPS) and a NYMI® wearable device. In the example, there is a local processing environment for local device processing on the mobile device, a nearby processing environment for nearby processing on the wearable device, and a remote server processing environment for server processing on the remote server.

In the FIG. 1F, the confidence calculator 100: at 1) receives confirmation messages from the wearable device 150 and at 2) obtains current location information from the mobile phone's location services 155 (GPS). The confidence calculator 100 then sends at 3) the location information to a remote service 160, which mines the tracking history of the user and at 4) responds with a value representing how common the user's travel path and location are. The confidence calculator 100 then at 5) aggregates the wearable device and mobile phone's analysis results to provide a single confidence component to the overall system.

This is a case where a single confidence calculator 100 uses a distributed workflow during its execution. In other cases, multiple confidence calculators 100 can be chained together over a distributed network environment (as discussed above).

FIG. 1G is a table 170 illustrating execution environments and characteristics of the locations where a confidence calculation can be processed, according to an example embodiment.

The table of the FIG. 1G describes the characteristics of the location methods relative to each other focusing on significant aspects related to passive and continuous authentication. Characteristics are in varying degrees of greyscale, the lighter greyscale reflecting the least amount of security, least complexity, and most performant while the darker greyscale reflecting the most amount of security, most complexity, and least performant.

When a confidence calculator 100 incorporates inputs from remote services or nearby interfaced (paired) connected devices (such as wearable devices in the example), the level of security provided by the communication connections (physical and logical) can be factored into the calculation of the confidence value as a risk component. For example, when a mobile phone has a secure authenticated connection with a wearable device using a cryptographically strong security protocol, the value provided by that input source weighs or is weighted more heavily in the final confidence calculation, whereas a value provided from a non-secured service/device has a lower value to compensate for its risky nature. Simply put, input sources and paired devices with a higher risk of man-in-the-middle (MITM) attacks or other types of compromise carry less weight in the overall confidence value calculation.

FIG. 1H is a table 175 illustrating a security-based priority-ordered listing of connection types as factors for consideration by confidence calculators 100, according to an example embodiment.

The table in the FIG. 1H is a list of interconnect methods used for connecting two devices or a device and a service for communicating data. This list attempts to include existing known input mechanisms, as well as service sources during confidence value calculations processed by confidence calculators 100.

The interconnect types are prioritized from more secure to less secure. It is noted that this is a qualitative ordering and some items that are ranked lower may rank higher in certain implementations based on specific deployed security mechanisms being deployed. In this manner, the table is a sample set meant to communicate an overall idea of the various interconnect methods and an approximate comparison of each relative to one another in terms of security.

Once the confidence value at any given point of time is needed, it is provided to an authentication service for providing a decision on whether to grant a user access to a device or authenticate a device to another device for communication. Again, the decision does not have to be a binary decisions meaning that different levels of authenticated access can be granted based on the confidence value when that confidence value is compared to predefined values, thresholds, or ranges of values that the authentication service uses to make decisions about authentication.

Figure 2:
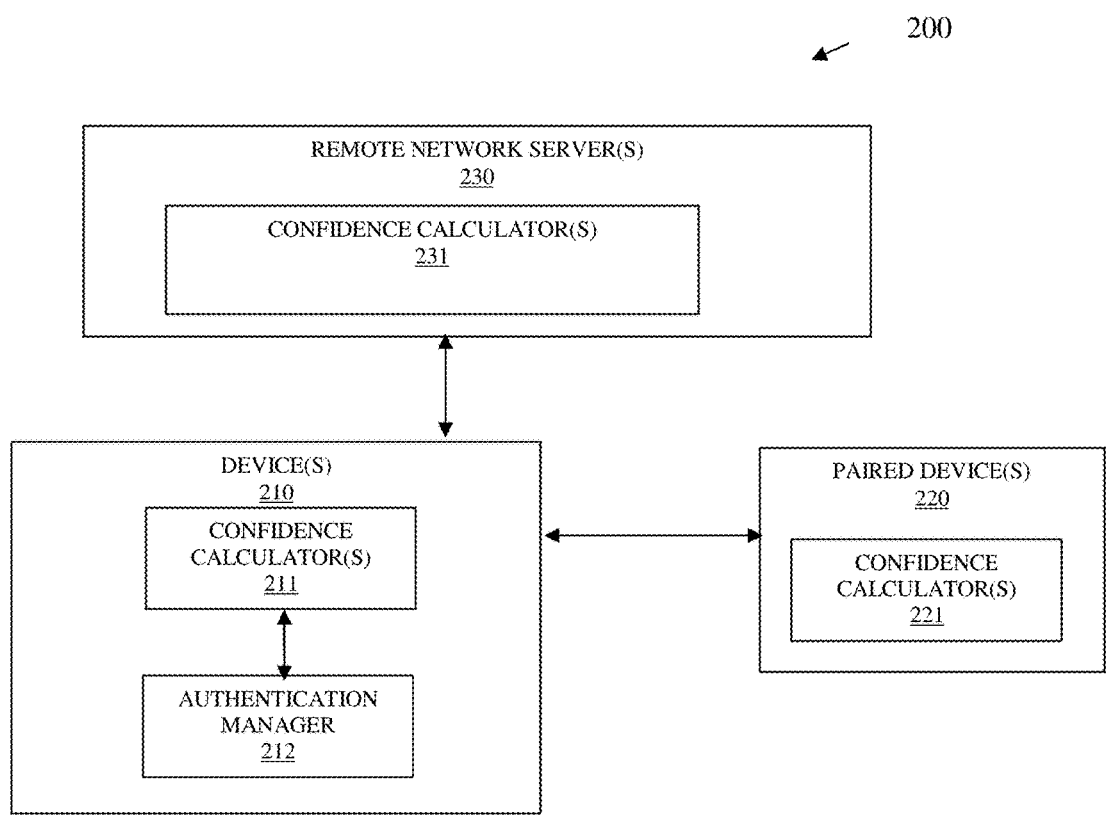
FIG. 2 is a diagram illustrating a system for automated authentication confidence determination, according to an example embodiment.

FIG. 2 is a diagram illustrating a system 200 for automated authentication confidence determination, according to an example embodiment.

The system 200 includes a device 210 having a confidence calculator 211 and an authentication manager 212. Optionally, the system 200 includes a paired/interfaced device 220 having a confidence calculator 221 and/or a remote network server 230 having a confidence calculator 231.

In an embodiment, the device 210 is mobile phone.
In an embodiment, the device 210 is a tablet.
In an embodiment, the device 210 is a laptop.
In an embodiment, the device 210 is an appliance.
In an embodiment, the device 210 is a desktop computer.
In an embodiment, the device 210 is a wearable processing device.
In an embodiment, the device 210 is a Self-Service Terminal (SST).
In an embodiment, the device 210 is a kiosk.
In an embodiment, the device 210 is a vehicle.
In an embodiment, the device 210 is an ATM.
In an embodiment, the device 210 is a Point-Of-Sale (POS) terminal.

The device 210 includes one or more processors, memory, and non-transitory computer-readable storage media. The device 210 is operated by a user and includes a variety of software, hardware, and data assets (resources), and, perhaps, integrated peripheral devices.

The confidence calculator 211 is implemented as one or more software modules as executable instructions that are programmed in the firmware, dedicated secure processor, general purpose memory and/or non-transitory computer-readable storage media of the device 210. The device's processors are configured to execute the confidence calculator 211. In an embodiment, the confidence calculator 211 is initiated and loaded for processing within the device 210 when the device 210 is booted or powered on.

The confidence calculator 211 is configured to execute in a transparent and unobtrusive manner so that the user can continue to operate the device without an indication of the processing being performed by the confidence calculator 211.

The frequency with which the confidence calculator 211 performs iterations to gather input streams and produce a confidence value is configurable. However, when an event is detected requiring authentication of the user, such as when: the user unlocks a screen rendered on a display of the device 210, powers the device 210 on, attempts to access a specific resource requiring additional authentication, and the like, the confidence calculator 211 provides access to continuously computed single scalar confidence values over time using input streams and techniques described above with the description of the FIGS. 1A-1H.

Upon such detected event, the authentication manager 212 retrieves the current confidence value from the confidence calculator 211.

It is noted that the authentication manager 212 may send the request that triggers the confidence calculator 211 to provide the currently calculated confidence value as well.

The authentication manager is preconfigured with authentication values, ranges of values, thresholds, and/or policy conditions that when compared against the single confidence value makes a decision as to whether to authenticate the user for access to the device 210 or as to whether to authenticate the user for access to a specific resource or specific set of resources accessible from the device 210.

In an embodiment, the processing of the confidence calculator 211 requests and uses confidence values supplied by one or more of: a confidence calculator 221 of a paired/connected device 220 and/or a confidence calculator 231 of a remote network server 230.

In an embodiment, the processing of the confidence calculator 221 uses input streams requested from and provided by the paired/connected device 220 and/or the remote network server 230.

The input streams processed by the confidence calculator 210 can be any of the ones mentioned above with the discussion of the FIGS. 1A-1H. Moreover, the input streams are not affirmatively provided by or manually inputted (through a Human Input Device (HID) of the device 210) by the user. That is, the confidence calculator 211 uses independent and objective data dynamically acquired at a time it is needed for authentication without any affirmative assistance being request of the user. The confidence calculator cooperates with the authentication manager 212 to continuously (at regular predefined intervals of time or at event-drive periods) passively authenticate the user for access to the device 210 or a resource of the device 210.

In an embodiment, the passive authentication performed is to determine whether to grant the user access to the paired/connected device 220.

In an embodiment, the passive authentication performed is to determine whether the paired/connected device 220 is to be permitted to pair or connect to the device 210.

In an embodiment, the passive authentication includes a confidence calculator 231 running on a remote network server 230.

In an embodiment, the passive authentication performed is to determine whether the remote network server 230 is permitted to connect to the device 210.

In an embodiment, the device 210 interacts with multiple paired devices 220 and multiple remote network servers 230.

The input streams fed as input to the confidence calculator 211 are continuously collected at predefined time intervals or upon detection of an event. The input streams include one or more of: audio samples gathered from a microphone of the device 210, images and/or video samples gathered from a camera of the device 210, geographical positioning information gathered from a GPS system of the device 210, biometric samples gathered from biometric sensors of the device 210, usage metrics for resources on the device 210 and gathers from logs resident on the device 210 or remotely accessible over a network connection from the device 210, and others.

The input streams are then weighted by the confidence calculator 211 using information relevant to one or more of: frequency maps, logs, history files, execution environment type for the confidence calculator 211, interconnection type used between the device 210 and the paired/connected device 220, interconnection type used between the device 210 and the remote network server 230, location of the confidence calculators (211, 221, 231) being used (on device 210, local off device 220, remotely off device over network 230), and others.

The input streams are processed through their respective confidence calculators: on device 211, on paired device 221, and remote server hosted 231, with the normalized confidence components then weighted and aggregated into the single confidence value provided to the authentication manager 212 for resolving whether to authenticate the user and/or whether to authentication the user with a defined security role having certain permissions with respect to resources of the device 210.

Some of embodiments of the FIGS. 1A-1H and the FIG. 2 and other embodiments are now discussed with reference to the FIGS. 3-5.

Figure 3:
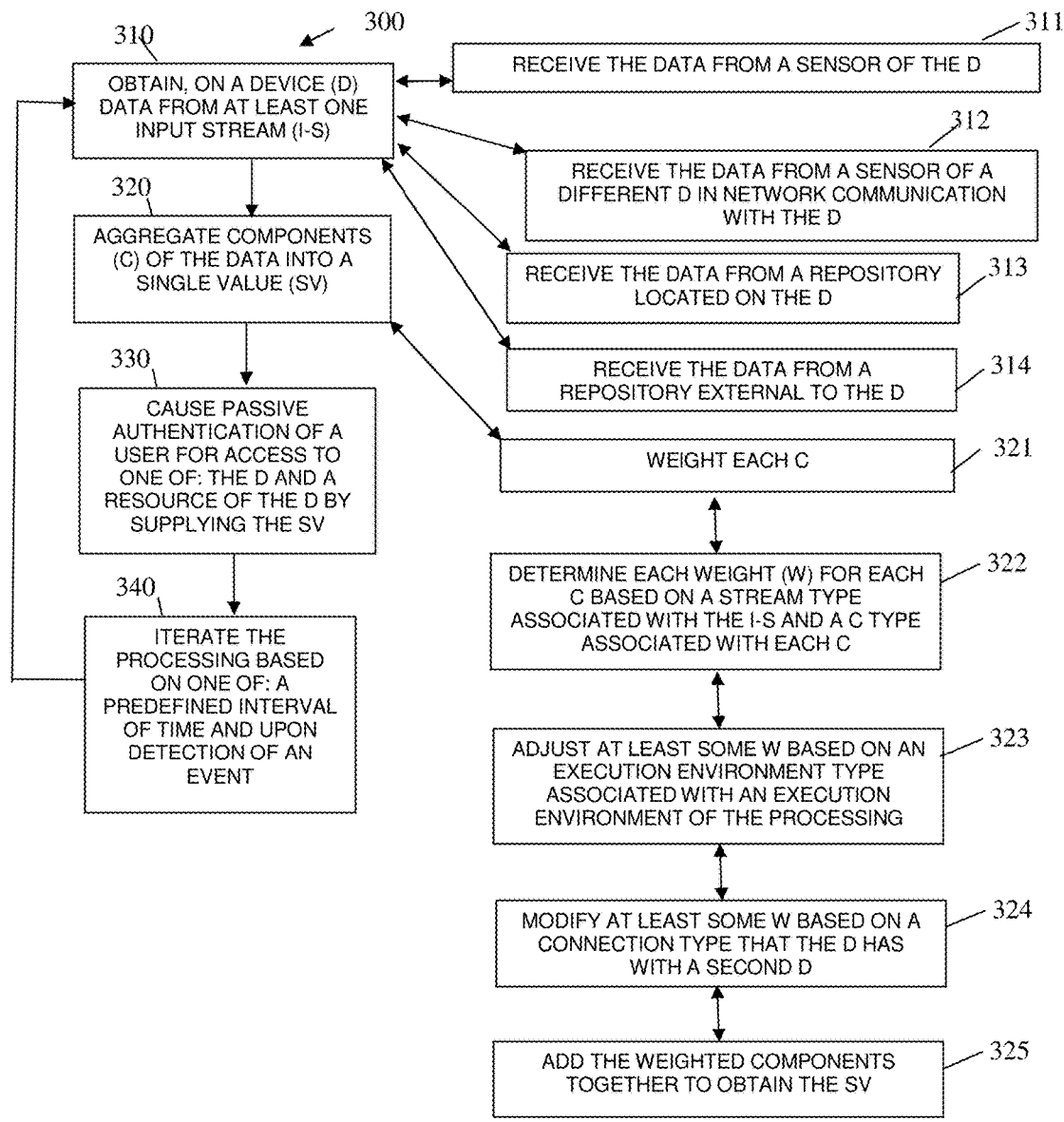
FIG. 3 is a diagram of a method for automated authentication confidence determination, according to an example embodiment.

FIG. 3 is a diagram of a method 300 for automated authentication confidence determination, according to an example embodiment. The software module(s) that implements the method 300 is referred to as an "authentication confidence calculator." The authentication confidence calculator is implemented as executable instructions programmed and residing within secure memory and/or a non-transitory computer-readable (processor-readable) storage medium and executed by one or more processors of a device. The processor(s) of the device that executes the authentication confidence calculator are specifically configured and programmed to process the authentication confidence calculator. The authentication confidence calculator has access to one or more network connections during its processing. The network connections can be wired, wireless, or a combination of wired and wireless.

In an embodiment, the device that executes the authentication confidence calculator is a POS terminal.

In an embodiment, the device that executes authentication confidence calculator is a Self-Service Terminal (SST).

In an embodiment, the device that executes the authentication confidence calculator is a kiosk.

In an embodiment, the device that executes the authentication confidence calculator is an Automated Teller Machine (ATM).

In an embodiment, the device that executes the authentication confidence calculator is a cashier-assisted terminal.

In an embodiment, the device that executes the authentication confidence calculator is a mobile phone.

In an embodiment, the device that executes the authentication confidence calculator is a tablet.

In an embodiment, the device that executes the authentication confidence calculator is wearable processing device.

In an embodiment, the device that executes the authentication confidence calculator is a vehicle.

In an embodiment, the device that executes the authentication confidence calculator is a laptop.

In an embodiment, the device that executes the authentication confidence calculator is a desktop computer.

In an embodiment, the device that executes the authentication confidence calculator is an appliance.

In an embodiment, the authentication confidence calculator is an instance of a confidence calculator described in the FIGS. 1A-1H.

In an embodiment, the authentication confidence calculator is the confidence calculator 211 of the FIG. 2.

In an embodiment, the authentication confidence calculator is the confidence calculator 221 of the FIG. 2.

In an embodiment, the authentication confidence calculator is the confidence calculator 231 of the FIG. 2.

At 310, the authentication confidence calculator obtains data from one or more input streams. In an embodiment, each different input stream is processed by a first stage function of the authentication confidence calculator. In an embodiment, the first stage functions are the first stage functions discussed above with reference to the FIGS. 1A-1H.

According to an embodiment, at 311, the authentication confidence calculator receives the data from a sensor of the device. For example: a camera, a microphone, a fingerprint sensor, GPS sensor, and others.

In an embodiment, at 312, the authentication confidence calculator receives the data from a sensor of a different device that is in network communication with the device.

The sensor can include any sensor mentioned above at 311 or discussed with reference to the FIGS. 1A-1H above.

In an embodiment, at 313, the authentication confidence calculator receives the data from a repository located on the device. This is an example of on-device data acquisition for the input stream.

In an embodiment, at 314, the authentication confidence calculator receives the data from a repository that is external to the device. This is an example of off-device data acquisition for the input stream.

At 320, the authentication confidence calculator aggregates components of the data into a single value. The time that each component is derived from the input stream is acquired as well. Permitting each component to be time-based. Moreover, each component can be single dimensional or multi-dimensional.

In an embodiment, at 321, the authentication confidence calculator weights each component.

In an embodiment of 321 and at 322, the authentication confidence calculator determines each weight for each component based on a stream type associated with the input stream and a component type associated with each component. The mechanism or function for resolving each weight can be determined based a variety of configured factors some of which were discussed above with reference to the FIGS. 1A-1H.

In an embodiment of 322 and at 323, the authentication confidence calculator adjusts at least some weights based on an execution environment type associated with an execution environment of the authentication confidence calculator. That is, the native perceived security of the authentication confidence calculator for the device executing the authentication confidence calculator based on the execution environment of the authentication confidence calculator can be a factor in weighting the components.

In an embodiment of 323 and at 324, the authentication confidence calculator modifies at least some of the weights based on a connection type that the device has with a second device. Here, consideration in factors associated with the weighting considers a connection type that the device has with the second device.

It is noted that the embodiments discussed at 323 and 324 were elaborated on above with the discussions of the FIGS. 1A-1H.

In an embodiment, at 325, the authentication confidence calculator adds the weighted components together to obtain the single value. It is noted that any calculation can be done to the weighted components to achieve the single value.

At 330, the authentication confidence calculator causes passive authentication of a user for access to one of: the device and a resource of the device by supplying the single current confidence value. That is, the authentication confidence calculator provides the single value to an authentication manager (such as the authentication manager 212 discussed above with reference to the FIG. 2, the authentication service discussed with reference to the FIGS. 1A-1H, and/or the authenticator discussed below with reference to the FIG. 4).

It is noted that direct communication is not required; rather, the authentication confidence calculator may write the single value to a secure (or tampered protected) memory and/or storage area (which may or may not be encrypted) where the authentication manager is designed to check when a confidence value (single value produced by the authentication confidence calculator) is needed for an authentication determination.

In an embodiment, at 340, the authentication confidence calculator iterates back to 310 at a continuous predefined interval of time and/or upon a detection of an event. That is, a current authentication value (single value) is always available to an authentication manager for use in determining whether the user of the device can at that point in time be authenticated for access to the device and/or the resource of the device. This is done through continuous and regular production of the single current value by the authentication confidence calculator, which continuously iterates the processing.

Figure 4:
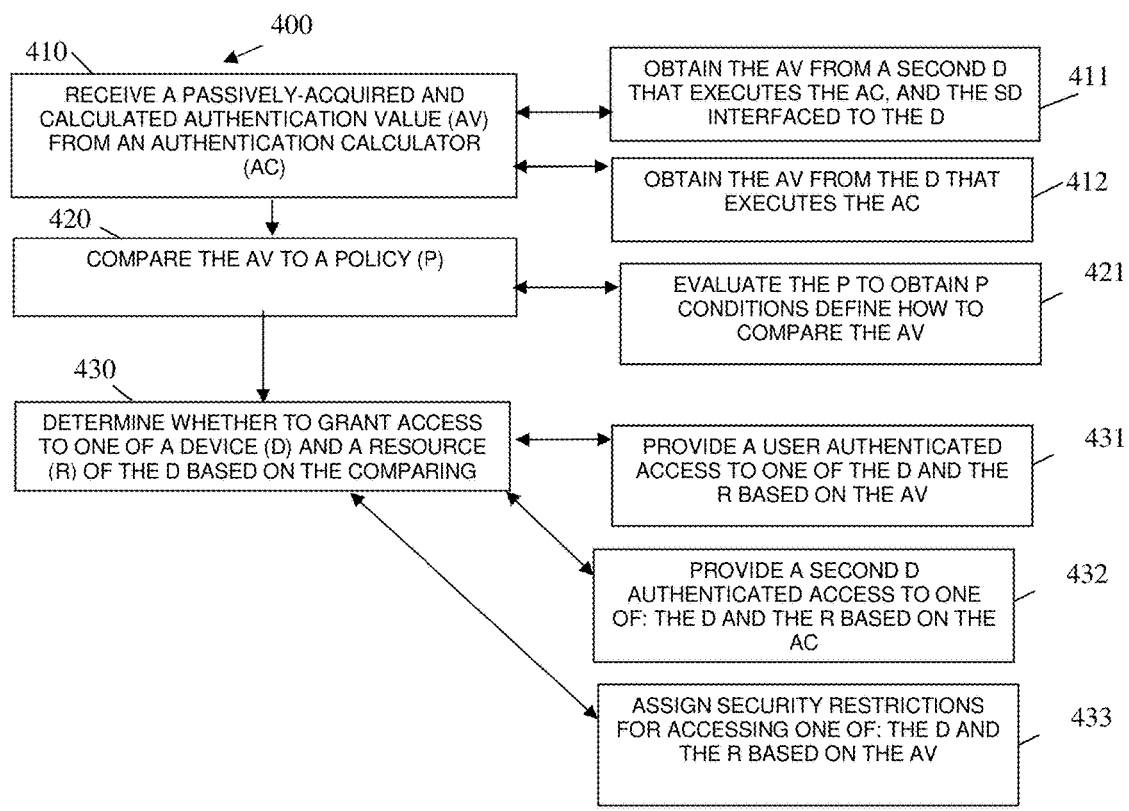
FIG. 4 is a diagram of another method for automated authentication confidence determination, according to an example embodiment.

FIG. 4 is a diagram of another method 400 for automated authentication confidence determination, according to an example embodiment. The software module(s) that implements the method 400 is referred to as an "authenticator." The authenticator is implemented as executable instructions programmed and residing within secure memory and/or a non-transitory computer-readable (processor-readable) storage medium and executed by one or more processors of a device. The processors that execute the authenticator are specifically configured and programmed to process the authenticator. The authenticator has access to one or more network connections during its processing. The network connections can be wired, wireless, or a combination of wired and wireless.

In an embodiment, the device that executes the authenticator is different from a second device that the authenticator is providing authentication for. In an embodiment, the device is within a local networked environment of the second device. In an embodiment, the device is remotely located over a Wide-Area Network (WAN) from the device.

In an embodiment, the device that executes the authenticator is a POS terminal.

In an embodiment, the device that executes authenticator is a Self-Service Terminal (SST).

In an embodiment, the device that executes the authenticator is a kiosk.

In an embodiment, the device that executes the authenticator is an Automated Teller Machine (ATM).

In an embodiment, the device that executes the authenticator is a cashier-assisted terminal.

In an embodiment, the device that executes the authenticator is a mobile phone.

In an embodiment, the device that executes the authenticator is a tablet.

In an embodiment, the device that executes the authenticator is wearable processing device.

In an embodiment, the device that executes the authenticator is a vehicle.

In an embodiment, the device that executes the authenticator is a laptop.

In an embodiment, the device that executes the authenticator is a desktop computer.

In an embodiment, the device that executes the authenticator is an appliance.

In an embodiment, the authenticator is the authentication service discussed above with reference to the FIGS. 1A-1H.

In an embodiment, the authenticator is the authentication manager 212 of the FIG. 2.

The authenticator takes as input a confidence value supplied by a confidence calculator and makes authentication decisions with respect to users, devices, and/or resources of those devices. The confidence calculator is an instance of one or more of: the confidence calculators discussed above with reference to the FIGS. 1A-1H and 2-3 (method 300).

At 410, the authenticator receives a passively-acquired and calculated authentication value from an authentication calculator. What is meant by "passively-acquired" is that the authentication calculator uses input for calculating the authentication value that is not manually supplied by a user.

In an embodiment, the authentication calculator is the confidence calculator of the FIGS. 1A-1H.

In an embodiment, the authentication calculator is one of the confidence calculators 211, 221, and 231 of the FIG. 2.

In an embodiment, the authenticator is the authentication confidence calculator of the method 300 for the FIG. 3.

According to an embodiment, at 411, the authenticator obtains the authentication value securely from a second device that executes the authentication calculator, and the second device is interfaced to the device. This is a situation where the authentication calculator that produces the authentication value executes on a different device from the device that executes the authenticator. This may also be a case where the authenticator is being asked to make an authentication device for the second device from a remote network connection.

In an embodiment, at 412, the authenticator obtains the authentication value from the device that executes the authenticator. Here, both the authentication calculator that produces the authentication value and the authenticator reside locally on a same device.

At 420, the authenticator compares the authentication value to a policy.

According to an embodiment, at 421, the authenticator evaluates the policy to obtain policy conditions, which define how to compare the authentication and to what the authentication value is to be compared against. For example, subtract the authentication value from a predefined value and compare the result to a predefined range of values or a threshold value; or does the authentication value fall within one or more predefined ranges of values.

At 430, the authenticator determines whether to grant access to one of: a device and a resource of the device based on the comparison performed at 420. This can be a binary determination such that access is either granted or denied. Alternatively, this can be access based on some resolved access-level, which is less than complete and unfettered access.

According to an embodiment, at 431, the authenticator provides a user of the device authentication access to one of: the device and the resource based on the authenticated value.

In an embodiment, at 432, the authenticator provides a second device authenticated access to one of: the device and the resource based on the authenticated value.

So, the authentication can be for a user or for a different device that is attempting to interface to the device.

In an embodiment, at 433, the authenticator assigns security restrictions for accessing one of: the device and the resource based on the authenticated value. Here, less than full access is provided and the level of access granted to the entity being passively authenticated can be configured based on the policy evaluation.

Figure 5:
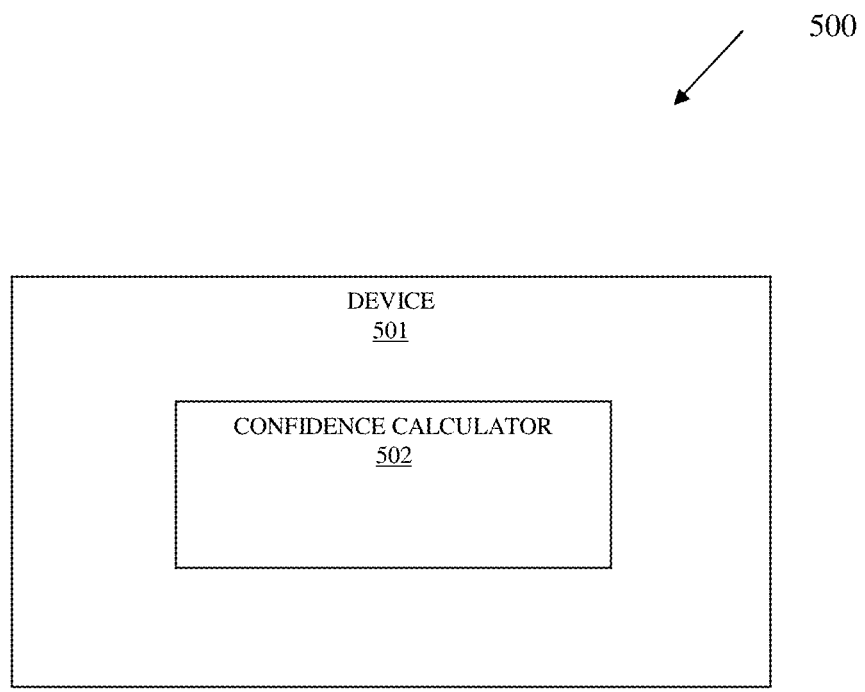
FIG. 5 is a diagram of an automated authentication confidence system, according to an example embodiment.

FIG. 5 is a diagram of an automated authentication confidence system 500, according to an example embodiment. The automated authentication confidence system 500 includes a variety of hardware components and software components. The software components of the automated authentication confidence system 500 are programmed and reside within secure memory and/or a non-transitory computer-readable medium and execute on one or more processors of the automated authentication confidence system 500. The automated authentication confidence system 500 communicates over one or more networks, which can be wired, wireless, or a combination of wired and wireless.

In an embodiment, the automated authentication confidence system 500 implements, inter alia, the embodiments discussed above with reference to the FIGS. 1A-1H.

In an embodiment, the automated authentication confidence system 500 implements, inter alia, the system 200 of the FIG. 2.

In an embodiment, the automated authentication confidence system 500 implements, inter alia, the method 300 of the FIG. 3.

In an embodiment, the automated authentication confidence system 500 implements, inter alia, the method 400 of the FIG. 4.

In an embodiment, the automated authentication confidence system 500 implements all and/or various combinations of the embodiments of the FIGS. 1A-1H, the system 500, the method 300, and the method 400.

The automated authentication confidence system 500 includes a device 501 and a confidence calculator 502.

In an embodiment, the device 501 is one of a mobile phone, a wearable processing device, a tablet, a laptop, a computer desktop, a POS terminal, a SST, an ATM, an appliance, and a vehicle.

The confidence calculator configured to: execute on the device 501, continuously compute authentication values based on evaluation of input streams passively acquired remotely from or on the device, and provide a current one of the authentication values to authenticate a user for access to one of: the device 501 and a resource accessible from the device 501.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    obtaining, on a device, data from at least one input stream;
    aggregating components of the data into a single value; and
    causing passive authentication of a user for access to one of: the device and a resource of the device by supplying the single value, wherein causing passive authentication further includes providing ongoing, continuous, and transparent authentication for the user to access one of: the device and the resource and without the user affirmative providing the at least one input stream with continuous updates to the single value based on changing components in the at least one input stream and with user authentication being dynamically provided when needed.

2. The method of claim 1, wherein obtaining further includes receiving the data from a sensor of the device.

3. The method of claim 1, wherein obtaining further includes receiving the data from a sensor of a different device in network communication with the device.

4. The method of claim 1, wherein obtaining further includes receiving the data from a repository located on the device.

5. The method of claim 1, wherein obtaining further includes receive the data from a repository external to the device.

6. The method of claim 1, wherein aggregating further includes weighting each component.

7. The method of claim 6, wherein weighting further includes determining each weight for each component based on a stream type associated with the at least one input stream and a component type associated with each component.

8. The method of claim 7, wherein determining further includes adjusting at least some weights based on an execution environment type associated with an execution environment of the method.

9. The method of claim 8, wherein adjusting further includes modifying at least some of the weights based on a connection type that the device has with a second device.

10. The method of claim 9, wherein modifying further includes adding the weight components together to obtain the single value.

11. The method of claim 1 further comprising: iterating the processing at one of: a predefined interval of time and upon detection of an event.

* * * * *